Our invention relates to an apparatus for measuring small changes in the content of a gaseous mixture.

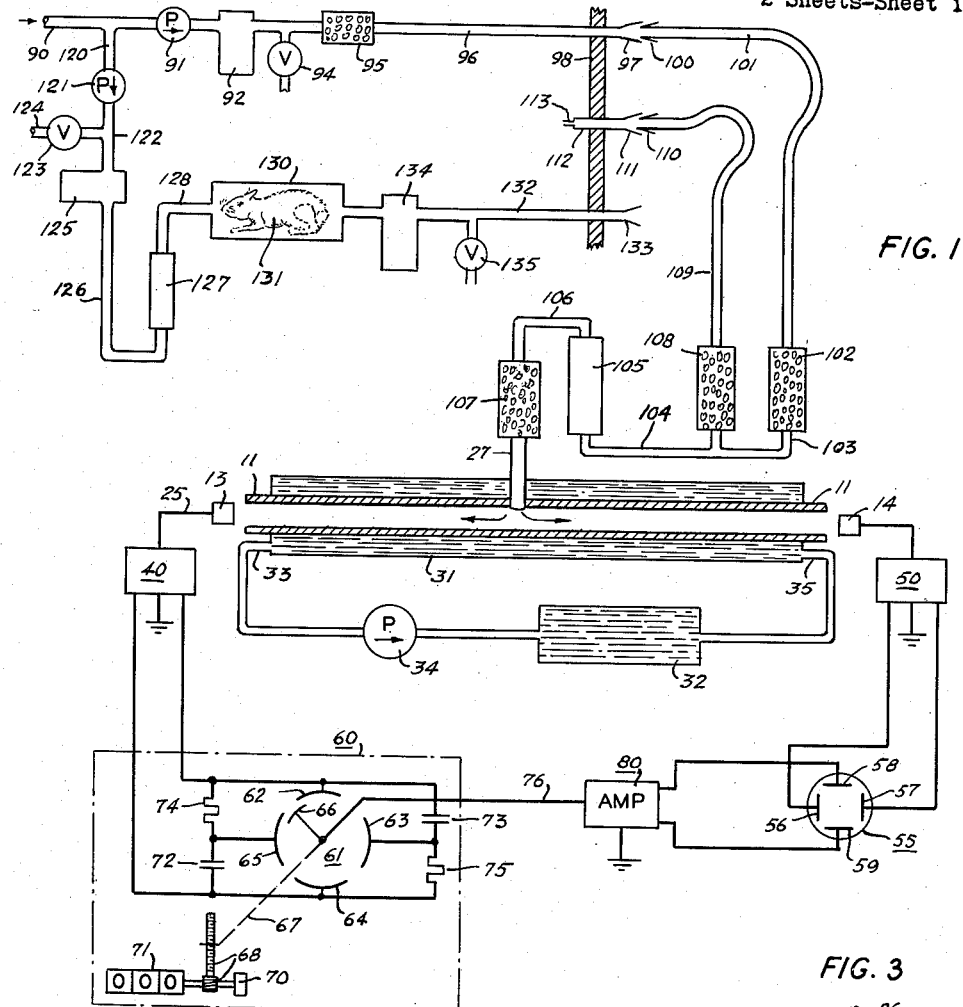
FIG. 1
FIG. 3
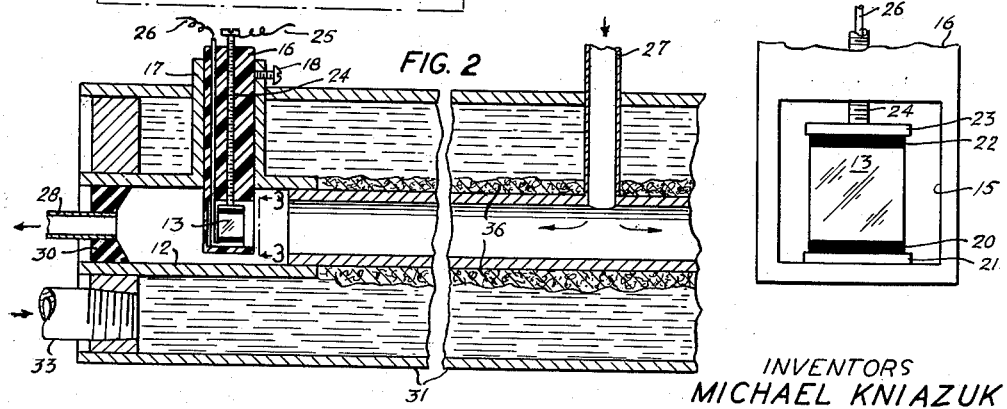
FIG. 2
INVENTORS
MICHAEL KNIAZUK
FRED R. PREDIGER
BY
ATTORNEY May 16, 1961
M. KNIAZUK ET AL
2,984,097
GAS MEASURING APPARATUS
Filed Sept. 11, 1956
2 Sheets-Sheet 2
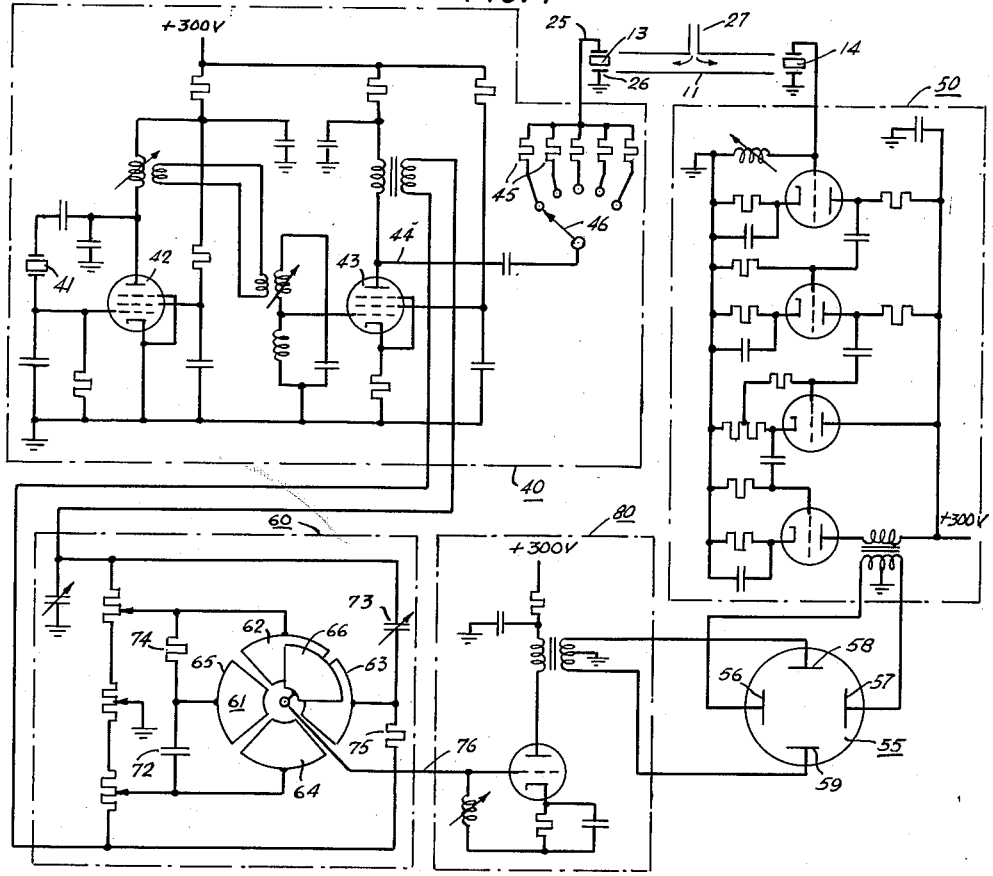
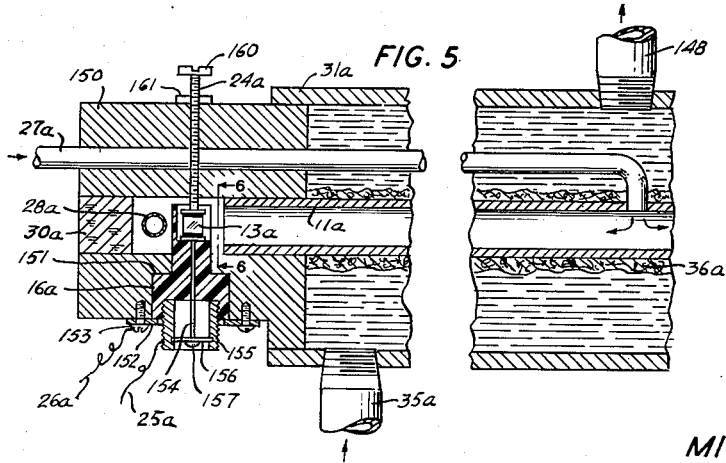
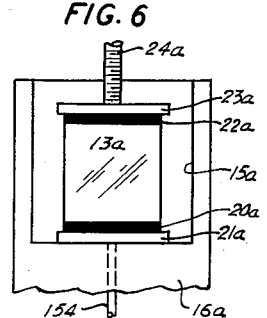
INVENTORS
MICHAEL KNIAZUK
FRED R. PREDIGER
BY
ATTORNEY 2,984,097
GAS MEASURING APPARATUS Michael Kniazuk, Mountainside, and Fred R. Prediger, Westfield, N.J., assignors, by mesne assignments, to Merck & Co., Inc., Rahway, N.J., a corporation of New Jersey Filed Sept. 11, 1956, Ser. No. 609,113
3 Claims. (Cl. 73—24)

Our invention is particularly useful in the various measurements of respiratory gases that are needed to determine basal metabolic rates in small laboratory animals. Examples of such measurements are (i) the amount of oxygen consumed by such animals, and (ii) their respiratory quotient (i.e. the ratio of the amount of carbon dioxide produced by the animal to the amount of oxygen consumed by the animal). For such measurements an apparatus according to our invention is highly accurate, yet is relatively simple in construction and operation.

Our invention makes use of the fact that different gases differ in their ability to transmit sonic waves through them. Stated in another manner, the rate of travel of sonic waves through a gas is a function of the physical properties of the gas. For gases which obey the "perfect gas" law, this relation may be expressed mathematically as follows:

$$v = k\sqrt{\frac{RCT}{M}} \quad (1)$$

where $V$ = the velocity of the sonic wave
$M$ = the molecular weight of the gas
$C$ = the specific heat ratio of the gas
$T$ = the absolute temperature of the gas
$R$ = the universal gas constant
$K$ = a constant dependent upon the sonic chamber used.

Thus, the velocity of sonic waves in certain gases in free space is given in the Smithsonian Physical Tables as follows:

| | Meters per second |
|---|---|
| In hydrogen, at 0° C. | 1284 |
| In methane, at 0° C. | 430 |
| In carbon monoxide, at 0° C. | 338 |
| In nitrogen, at 0° C. | 334 |
| In air, dry, at 0° C. | 331.6 |
| In argon, at 0° C. | 319 |
| In oxygen, at 0° C. | 316 |
| In carbon dioxide, at 0° C. | 259 |

In the apparatus according to our invention, the gas which is to be measured is passed continuously through a tube, for convenience referred to as the sonic tube. Sonic waves are generated at one end of this sonic tube and picked up at the other end. The frequency of the zonic waves is constant, so that the wave length of the sonic waves is constant. Also, the distance between the sonic wave generator and receiver is constant. Hence, for a given gas in the sonic tube, the travelling sonic waves in the sonic tube consist of the same fixed number of wavelengths between generator and receiver. This fixed number may be whole wavelengths or whole wavelengths plus a fixed fraction of a wavelength. These travelling sonic waves are sometimes referred to as propagated plane waves.

When a different gas is passed through the sonic tube the velocity of the sonic waves through the new gas is different from that through the gas originally in the tube. This change in velocity of the same frequency sonic waves between the same two fixed points (i.e. the generator and receiver), results in each sonic wave consisting of a new fixed number of wavelengths between the generator and receiver. Again, this fixed fraction number may be whole wavelengths or whole wavelengths plus a fixed fraction of a wavelength.

In general, the change in the number of wavelengths of the sonic waves in the sonic tube as a different gas is passed through the sonic tube is accompanied by a change in the phase of the receiver end of the waves with respect to their phase at the generator end. For example, the receiver ends of the sonic waves might be exactly in phase with the generator ends of the waves for gas A (this would indicate that the waves in the sonic tube consisted of a whole number of wavelengths of the sonic wave). When gas B is passed through the tube, the receiver ends of the sonic waves might be 60 degrees (i.e., sonic wave degrees) out of phase with the generator ends of the waves. (This would indicate that the waves in the sonic tube consisted of a whole number of wavelengths of the sonic wave, plus $$\frac{60}{360}$$

of a wavelength, or minus $$\frac{60}{360}$$

of a wavelength, depending upon the direction in which the phase shift occurred.)

The relationship of the phase of the receiver end of the sonic waves with respect to the phase of the generator end of the sonic waves is thus related to the nature of the gas in the sonic tube. We make use of this phase relationship in our apparatus.

The difference in the number of wavelengths in the sonic tube for two gases is related to the difference between the velocities of sonic waves through the two gases. Thus, if the original gas is air (which has a sonic transmitting velocity of 331.6 meters per second at 0° C.), and the second gas is methane (which has a sonic transmitting velocity of 430 meters per second at 0° C.) the difference in sonic transmitting velocities at 0° C. is 98.4 meters per second, or approximately a 30 percent change.

On the other hand, if the original gas is oxygen, and the second gas is nitrogen, the difference in sonic transmitting velocities (at 0° C.) is only 18 meters per second, or approximately a 5.7 percent change.

In basal metabolism determinations the difference in sound transmitting velocities between the gases to be measured is of a still smaller magnitude.

For basal metabolism determinations apparatus is therefore required which is accurately responsive to relatively small changes in sonic transmitting velocities. Expressed in another manner, the apparatus must be responsive to relatively small changes in the sonic wave pattern in the sonic tube, or expressed in still another manner, to relatively small changes in the phase of the received sonic wave with respect to the transmitted sonic wave.

The apparatus according to our invention has the necessary accuracy for these determinations, while at the same time enabling them to be made simply and rapidly.

Other features of our invention will appear from the following description in conjunction with the accompanying drawings, in which Figure 1 is a partially schematic diagram of an apparatus set up to determine basal metabolic rates in small laboratory animals, such as rats;

Figure 2 is a cross sectional view of one end of the sonic tube and associated parts which are shown diagrammatically in Figure 1;

Figure 3 is an enlarged view of the piezo-electric crystal and associated parts, taken as shown by the line 3—3 in Figure 2;

Figure 4 is a schematic wiring diagram on the electrical components of the apparatus, shown in greater detail than in Figure 1;

Figure 5 is a cross sectional view of one end of a modified sonic tube and associated parts, and Figure 6 is an enlarged view of the piezo-electrical crystal and associated parts, taken as shown by the line 6—6 in Figure 5.

Referring to Figures 1, 2 and 3, the sonic tube 11 is preferably a metallic tube that is long with respect to its inside diameter. Fastened to the ends of the tube are T-shaped fittings 12 serving as extensions of the tube 11, while at the same time providing transverse openings through which the piezo electric crystals 13 and 14 may be inserted and supported at opposite ends of the sonic tube.

The crystal 13 is mounted in a pocket 15 at the lower end of a Lucite holder 16 which extends up through the opening formed by the wall 17 of the fitting 12. The holder 16 is secured to the fitting by screw 18.

The crystal 13 rests upon a rubber pad 20 between it and the metallic plate 21, the latter being positioned on the floor of the pocket 15 in the Lucite holder 16 and serving as one electrode for the crystal. At the top of the crystal 13 is a rubber pad 22, and above this is a metallic plate 23 which serves as the other electrode for the crystal 13. Threaded into the holder 16 is a metallic rod 24 the lower end of which abuts against the plate 23 to keep it, and the crystal 13, in position and also to provide the electrical connection to plate 23 from the connecting wire 25 outside the sonic tube assembly. A wire 26 connected to the bottom plate 21 extends up through a suitable opening in the holder 16 to provide the electrical connection to plate 21 from outside the sonic tube assembly.

Crystal 14 at the other end of the tube is mounted and arranged similarly as described for crystal 13.

The piezo electric crystals 13 and 14 are preferably ammonium dihydrogen phosphate crystals. Such a crystal, when serving as a sonic generator, provides a relatively high sonic output from a relatively small electrical input. In addition, such a crystal works satisfactorily at zero humidity. Some piezo electric substances, such as Rochelle salt, do not work satisfactorily at zero humidity, for at this humidity the material tends to lose its piezo electric properties.

The crystals 13 and 14 are cut so that they expand and contract in length, and the crystals are mounted in their holders 16 so that their length is positioned axially with the tube 11. When the crystals are of the preferred material—ammonium dihydrgen phosphate, also known as ADP—the crystals are 45° Z cut.

The frequency at which the crystals 13 and 14 are resonated, and the relationship of that frequency to the distance between the crystals in the sonic tube, is an important feature of our invention. The frequency is a sonic frequency above the audible range, and preferably is of the order of 150 kilocycles.

The wavelength of this sonic frequency inside the sonic tube varies with the velocity with which the gas in the sonic tube transmits the sonic waves. Assuming the gas in the sonic tube is normal, dry atmospheric air at 0° C., the distance between the crystals 13 and 14 in the sonic tube is a large number of wavelengths of the frequency at which the crystals 13 and 14 are resonated, and preferably of the order of 200 to 600 wavelengths. For example, when the resonance frequency is 150.1 kilocycles, a very satisfactory distance between the crystals is about 94 centimeters. This is about 450 wavelengths of this sonic wave in the tube 11 when it contains normal dry atmospheric air at 31° C. or about 470 wavelengths at 0° C.

The diameter of the sonic tube is small in relation to its length, as previously stated. This enables tests to be made on a small volume of gas, with the consequent simplicity in construction of the apparatus and ease of its operation. As an example of the order of magnitude involved, in the apparatus where the sonic tube length (i.e. distance between crystals 13 and 14) was 94 centimeters, the inside diameter of the sonic tube was 8 millimeters.

While it might appear that the use of such a small diameter for the sonic tube would cause objectionable sonic wave patterns due to reflections in the tube, we have found that any such effect is negligible. Apparently this is due to the great length of the sonic tube. In any event, we have found that the wave pattern in the sonic tube of the apparatus according to our invention can be considered to be equivalent to the sonic wave pattern formed in free space.

The gas which is to be measured is introduced into the sonic tube 11 at its midpoint, through the gas inlet tube 27. The gas thus flows in the sonic tube 11 in opposite directions, part of the gas travelling to the right (as viewed in Figs. 1 and 2) and the balance of the gas travelling to the left. The gas passes by the piezo electric crystal at the end of the tube and passes out of the sonic tube 11 through the gas outlet tube 28. The latter extends through a stopper 30 which closes the free end of the T-shaped fitting 12. The gas outlet tube 28 may discharge the gas into the room at that point. Alternately, the gas outlet tubes at the two ends of the sonic tube may be connected by suitable tubing to opposite ends of a T-fitting, which then discharges through the third passageway in the fitting into the room.

The introduction of the gas into the sonic tube at its midpoint so that the gas flows through the sonic tube in opposite directions eliminates any error in measurement due to the velocity of the gas, for any effect due to gas velocity in one half of the sonic tube is counteracted and nullified by any such effect due to gas velocity in the other half of the sonic tube.

The velocity of sonic waves in a gas varies somewhat with the temperature of the gas. To eliminate possible inaccuracies due to temperature changes of the gas, the sonic tube is maintained at a constant temperature. This is effected by surrounding it with a larger diameter tube 31 to form a water jacket around the sonic tube, and pumping water from a constant temperature reservoir 32 through the water jacket. The water is withdrawn from one end of the jacket, as at 33, and after being pumped by pump 34 and passed through the reservoir 32 where its temperature is restored, the water is introduced into the other end of the jacket, as at 35. In practice, it is preferred to maintain the temperature of the water in the reservoir 32 around 10° F. higher than the ambient or room temperature. It is also preferred to wrap the sonic tube 11 with a lagging material 36, such as synthetic sponge material or woven gauze, which tends to immobilize a layer of water around the sonic tube, and delay the thermal response of the tube to temperature changes of the water. Hence, if the control device for maintaining constant temperature of the water in reservoir 32 causes slight temperature fluctuations of the water, these temperature fluctuations are ironed out by the action of the lagging material 36 before they are effective to change the temperature of the sonic tube 11.

The piezo electric crystal 13 is caused to generate sonic waves by the action of the electric tube oscillator generally designated by 40. These sonic waves, after passing from the generator end of the sonic tube 11 through the tube to its other end, are picked up by the receiving piezo electric crystal 14 and converted to electrical energy. This electrical energy is amplified by the electronic amplifier generally designated as 50, and applied to one pair of the deflection plates 56 and 57 of the cathode ray tube generally designated by 55.

The frequency of the oscillator 40 is controlled and maintained constant by the piezo electric crystal 41, the frequency maintained being that at which the crystals 13 and 14 are resonated. 42 is the electron oscillator tube, the output of which is fed to an amplifier or driver tube 43. The output of the latter is fed by conductor 44 to conductor 25 and thence to the sonic generator crystal 13. Preferably a series of resistances 45 of different values are arranged to be selectively inserted in the feed line to the sonic generator crystal 13 so that the power input to sonic generator crystal may be changed by rotating switch 46.

The output circuit of the driver tube 43 also feeds a phase shifting unit generally designated by 60. This does not shift the phase of the electrical waves fed to the sonic generator crystal 13; it serves to shift the phase of a wave which is bled from the driver tube and which is otherwise synchronous with the electrical wave fed to the sonic wave generating crystal 13, and thus, with the sonic wave in the tube 11.

The adjustable capacitor 61 is part of an electrical network including fixed capacitors 72 and 73 and resistors 74 and 75. In one complete revolution of the movable plate 66 the output of the phase shifting unit 60 at the connection 76 is shifted 360 electrical degrees. In this revolution the counter 71 has moved through 999 digits and returned to its starting point, 0—0—0.

The output of the phase shifting unit 60 is connected to an amplifier 80. The output of this amplifier is connected to a second pair of deflection plates 58 and 59 of the cathode ray tube 55. The other details of the cathode ray tube 55 are not necessary to describe.

When a sinusoidal voltage is applied across one pair of plates, such as 56 and 57, of the cathode ray tube, and a sinusoidal voltage of the same frequency is also applied across the other pair of plates such as 58 and 59 of the cathode ray tube, there is produced on the screen of the tube a series of Lissajous patterns. The specific shape of the pattern at any time is dependent upon the phase relationship of one voltage to the other. When the voltages applied across the pairs of plates of the cathode ray tube 55 are in phase, the Lissajous figure is a straight line. This line extends from the quadrant between two adjacent cathode ray plates to the quadrant between the opposite two plates. For convenience in the following description, the Lissajous line having its upper half in the quadrant between plates 57 and 58 is referred to as having a positive slope, while the Lissajous figure having its upper half in the quadrant between plates 58 and 56 is referred to as having a negative slope.

As the phase relationship between the voltages applied across the pairs of plates in the cathode ray tube shifts to a 90° phase relationship, the straight line Lissajous figure changes to an elliptical or circular figure. When the phase relationship between the applied voltages changes from 90 to 180 electrical degrees, the Lissajous figure in the cathode ray tube changes to a straight line with a negative slope. When the phase displacement between the applied voltages increases to 270 electrical degrees, the Lissajous figure is again an elliptical or circular one. Finally, as the phase displacement between the applied voltages increases to 360 electrical degrees, the Lissajous pattern becomes a straight line identical with the one at the start, i.e. with a positive slope.

By adjusting the capacitor 61 the phase relationship of the voltage applied across the cathode ray plates 58 and 59 may be varied with respect to the voltage applied across plates 56 and 57. In general, it is preferred to adjust the capacitor 61 at the start so that a straight line of positive slope appears in the cathode ray tube. Then, if there is a change in the phase relationship of the voltage applied across the plates 56 and 57, as by virtue of the action in the sonic wave tube, the Lissajous figure in the tube changes. The adjustable condenser 61 is then moved such an amount as to restore the Lissajous figure to a straight line of positive slope. The amount of movement of the adjustable condenser 61 required to effect this change is a measure of the amount of the phase displacement from the original in-phase relationship.

When the apparatus is used for basal metabolism determination, the reference gas is preferably outside air, i.e. air from outside the building, so that its composition is constant. In Fig. 1 the outside air passes through tube 90 to the pump 91. As the pump produces air pulsations, the pump discharges into a surge tank 92 of sufficient size to substantially eliminate the pulsations in the air flow. The air then flows through tube 93 to a chamber 95 filled with a gas-drying agent, such as silica gel. Connected to tube 93 is a valve 94 which serves to control the flow of air through the system by adjustably bleeding air from the tube 93 to the room. The air from the chamber 95 flows through tube 96 to an internally tapered connector block 97 mounted on a panel 98.

A flexible tube 101 has at one end an exteriorly tapered connector plug 100 that fits into the internally tapered connector block 97. This forms an airtight connection between tubes 96 and 101 that may be readily broken by disengaging the connectors.

The other end of tube 101 feeds the air to a chamber 102 filled with a substance which absorbs carbon dioxide, such as sodium hydroxide on asbestos pellets, one form of which is marketed under the name "Ascarite."

The air then flows through tubes 103 and 104 to a flow meter 105, which measures the rate of flow of the air. From this meter 105, the air passes through tube 106 to a chamber 107 filled with a gas drying agent, such as magnesium perchlorate, one form of which is marketed under the name "Dehydrite." This chamber 107 is close to the sonic tube 11 so that any water vapor that may have leaked into or penetrated into the connecting tubing is completely removed. The resulting gas fed into the sonic tube 11 is thus free of all water vapor.

Connected to tube 103 is a chamber 108 filled with a gas-drying agent, preferably similar to the material in chamber 107. The other end of chamber 108 is connected to a flexible tube 109 the free end of which has a tapered connector plug 110 similar to plug 100. In the condition illustrated in Fig. 1, connector plug 110 engages a connector block 111 similar to connector block 97. This connector block 111 is at one end of a tube 112. At the other end is a small, fixed orifice 113. Thus, some of the air which passes through tube 103 is bled away through the chamber 108, tube 109 and orifice 113 into the room. Preferably, the size of the orifice is such that about 10 percent of the total gas flowing through chamber 102 is bled through orifice 113 into the room. The remaining 90 percent of the gas passes on into tube 104 and on into the sonic tube 11. This bleeding action serves to prevent any gas contained in chamber 108 from diffusing back into the gas flowing into the sonic tube.

In the position of flexible tubes 101 and 109 as shown on Fig. 1, the apparatus is in condition for initial adjustment. A gas of known composition (in this case, air free of $CO_2$) is passed through the sonic tube 11, and the capacitor 61 is adjusted to secure the straight line Lissajous figure of positive slope in the cathode ray tube 55. At this time the counter is set to "0—0—0" without disturbing the adjustment of the capacitor 61, and then the counter is engaged with the capacitor knob 70.

To measure the oxygen uptake in a laboratory animal, the flexible tube 100 is disconnected from connector block 97 and connected to connector block 133. When this is done, the outside air from tube 90 passes through tube 120 to the pump 121. From the pump the air passes through tube 122 to surge tank 125. This is of sufficient size to substantially eliminate pulsations in the air flow. Tube 122 has a valve 123 which serves to control the flow of air from the pump 121 into the surge tank and on to the laboratory animal 131. When the valve 123 is opened, excess air is discharged into the room through tube 124.

Before the air reaches the laboratory animal 131 it passes through tube 126 to the flow meter 127 so this enables the rate of air flow to be measured. From the flow meter the air passes through tube 128 to the animal chamber 130.

The animal 131 in the chamber 130 consumes some of the oxygen in the air and expires some $CO_2$ gas, so that the gas passing out of the animal chamber 130 no longer has the same composition as the reference gas.

The gaseous mixture from the chamber 130 passes through the surge tank 134 to the tube 132, which terminates in the connector block 133. This gaseous mixture then passes through tube 101 (connector plug 100 being engaged with connector block 133) down into the apparatus as previously described.

Valve 135 connected to tube 132 serves to bleed off excess volume of gas passing into tube 132 so that the volume of the gas mixture now being fed into the sonic tube, per unit of time, is about the same as when the reference conditions were established.

As an illustration of the flexibility of this apparatus, the preferred rate of flow into the sonic tube is about 100 cubic centimeters per minute. This flow rate is largely determined by the ability of the absorbers in chambers 95, 102 and 107 to function satisfactorily. With larger absorbers the flow rate could be increased.

The rate of flow of air to the test animal is largely determined by the size of the animal. Consequently, the arrangement described enables this flow to be increased over a considerable range so as to accommodate laboratory animals of different breeds and different sizes. For example, with rats the preferred flow rate over the animal is about 400 cubic centimeters per minute. As pump 121 is generally a fixed capacity pump, the appropriate flow rate over the animal is secured by adjusting valve 123.

As it is desirable to have the rate of flow of the gas from the animal chamber 130 through the chambers 102 and 107 approximate the rate of flow of the reference gas, valve 135 is adjusted to bleed off the excess gas.

The chamber 102 serves to remove the carbon dioxide from this gas and the chamber 107 serves to remove the water vapor therefrom. Consequently the gas now being introduced into the sonic tube 11 (conveniently referred to as the "sample gas"), differs from the reference gas only by virtue of a reduced oxygent content.

The sample gas in the sonic tube causes the velocity of the sonic waves to be different from that when the reference gas was passed through the tube. The distance between the crystals 13 and 14 remaining constant, and the sonic frequency remaining constant, there is a change in the number of wavelengths of the sonic frequency that exist in the sonic tube between the crystals. Accompanying this is a displacement of the phase of the voltage applied across the cathode ray plates 56 and 57 with respect to the phase of the voltage applied across the plates 58 and 59. This is evident from a change in the Lissajous pattern produced on the screen of the cathode ray tube 55.

By adjustment of the knob 70, the phase shifting unit 60 is effective to restore the original phase relationship between these two voltages. As previously explained, the amount of rotation of the knob 70 (and thus of the condenser 61) is a measure of this phase displacement. This is indicated numerically by the digits on the counter 71. As an illustration, the counter 71 may read 250 at the time that the Lissajous figure is restored in the cathode ray tube to a straight line of positive slope.

From this reading the difference between the oxygen content of the reference gas and the oxygen content in the sample gas may be computed, after the apparatus has been calibrated.

The preferred calibration is effected by taking a sample of the reference gas (outside air) in a closed container containing also alkaline pyrogallate or sodium hydrosulfite, in order to absorb all the oxygen from the gas. After being exposed to the chemical for several hours, the contents of the container are displaced by water into the flexible tube 101, and a phase displacement determination made, similarly as described above.

It should be noted that if the change in the number of wavelengths in the sonic tube 11 is more than one wavelength, the Lissajous pattern on the cathode ray tube 55 will go through more than one complete cycle of patterns. A complete cycle of patterns has been previously described. Consequently, the cathode ray tube 55 should be observed as the sample gas is introduced into the sonic tube 11 until the Lissajous pattern becomes stationary, counting, if it occurs, the number of times the straight line of positive slope reappears in the transition period. Then, after the control knob 70 is adjusted as required to restore the condition of a straight line of positive slope in the cathode ray tube, there should be added to the digits of the counter 71, one thousand digits for each reappearance of the straight line of positive slope during the transition period.

In basal metabolism determinations, a measurement in addition to the ones already described is employed. For this purpose the tube 109 is connected by its connector 110 with the connector block 133 so that the gas from the animal chamber 130 is introduced into the sonic tube 11 through the chamber 108 rather than the chamber 102. Chamber 108 contains a gas drying agent similar to that in chamber 107. As a result the $CO_2$ in the gas from the animal chamber 130 is not removed before introducing into the sonic tube. Consequently the measurement of the gas flowing through the sonic tube under this condition is a measurement of the gas mixture free of water vapor but including the oxygen content and $CO_2$ content therein as it flows from the animal chamber.

When the apparatus is set up for this determination, the tube 101 is disconnected from the connector block 97 and connected to the connector block 111. Thus, during the measurement in question, some of the gas from the animal chamber 130 flowing through chamber 108 is bled by tube 103 through the chamber 102 and tube 101 and 112 through the orifice 113. This ensures that any residual gas in chamber 102 does not contaminate the readings when the gas being measured is flowing through chamber 108.

In basal metabolism determinations it is desirable to make concurrently two different gas analyses of the gas flowing from the animal chamber. One of these is a measurement to determine oxygen uptake; the other is a measurement to determine the respiratory quotient. With the apparatus of the invention, each analysis is made sufficiently rapidly so that while the analyses are successive in time, they are for practical purposes equal to concurrent measurements. This effect is aided by the volume of the animal chamber 130 and the surge tank 134, which serve to prevent any rapid change in the composition of the gas being passed through the sonic tube.

The oxygen uptake is computed from the measurement when the $CO_2$ is absorbed from the sample gas. The respiratory quotient is computed from the above measurement as well as the measurement when the $CO_2$ is not removed from the sample gas. The calibration of the apparatus for the second measurement is effected by burning known chemicals to obtain known quotients.

Figures 5 and 6 illustrate a modified apparatus in which the air introduced into the sonic tube is introduced into the end of the assembly rather than through the water jacket. In these figures the elements with the small letter "a" at the end correspond to the same numbered elements without the letter "a" in Figures 1, 2 and 3. Thus the gas intake tube 11a is through the tube 27a, which extends parallel with sonic tube until it is near the mid-point of the tube, at which point it is bent so as to introduce the air into the mid-point of the tube. The thermostatically controlled water flow is introduced at each end of the tube, as at 35a, while the discharge of the water from the jacket 31a is at the center of the tube through pipe 148.

The crystal 13a is mounted on a holder 16a which extends into the assembly from the bottom thereof, rather than projecting down into the assembly from the top, as in Figures 2 and 3. The holder 16a fits into an appropriate recess in the brass or other metallic plug 150. The top plate 23a is adjustable with respect to the crystal by a threaded rod 24a having a head 160 and a lock nut 161. The connection 26a is made to the metallic plug 150. The plate 21a at the bottom of the crystal is connected by wire 154 to the metal sleeve 155 which is threaded into the holder 16a of insulating material, the connection being by way of the metallic washer 156 and the piece of solder 157. The holder 16a is maintained in position by an annular ring 152 which is held in place by screws 153. The internal diameter of the annular ring 152 is larger than the exterior diameter of sleeve 155 so that there is no electrical contact therebetween.

While the phase shifting unit 60 is shown in this apparatus as positioned between the oscillator 40 and the cathode ray tube 55, the phase shifting unit 60 might be positioned in the circuit between the receiving crystal 14 and the cathode ray tube 55. Alternatively, the phase shifting unit 60 might be positioned in the circuit between the oscillator 40 and the transmitting crystal 13.

What is claimed is:

1. An apparatus for measuring the variations in content of one gas in a mixture of gases comprising, a single tube open at both ends and through which reference gases and gases being measured must pass alternatively, a thermostatically controlled jacket around the tube, means for passing the gases through said jacket and to a mid-point on the tube, means for removing the gases at each end of the tube, a transmitting piezo-electric crystal fixed at one end of the tube, a receiving piezo-electric crystal fixed at the other end of the tube, a cathode ray tube having two pairs of deflection plates positioned to deflect the electron beam of the tube in the $x$ and $y$ coordinates, a stable crystal controlled oscillator for generating sinusoidal voltage of sonic frequency, means for applying said voltage to the transmitting piezo-electric crystal, means for applying the voltage of sonic frequency induced in the received piezo-electric crystal to one pair of deflection plates of the cathode ray tube, and means for applying the voltage from the sonic frequency generator to the other pair of deflecting plates of the cathode ray tube, one of said means having included therein an electrical phase shifting unit for adjusting the phase of the output of said means and thereby measuring the phase displacement caused by the variation in content of said one gas in the mixture.

2. An apparatus as described in claim 1 in which the exit openings for the gases are positioned at each end of the tube after the gases have passed the piezo-electric crystal at the corresponding end of the tube, with each of said openings having a diameter which is substantial in relation to the inside diameter of the tube, whereby a change in the content of the gas to be measured is rapidly and completely effective throughout the tube so that an accurate determination by the apparatus may be made in a minimum of time after there has been a change in the content of the gases introduced into the apparatus.

3. An apparatus as described in claim 1 wherein means are provided to remove carbon dioxide and water vapor from the gases prior to entry thereof into the tube.

References Cited in the file of this patent

UNITED STATES PATENTS

| 2,521,634 | Janssen et al. | Sept. 5, 1950 |
| 2,775,885 | Rassweiller et al. | Jan. 1, 1957 |
| 2,874,564 | Martin et al. | Feb. 24, 1959 |

FOREIGN PATENTS

| 404,809 | Germany | Oct. 21, 1924 |
| 881,644 | France | Apr. 30, 1943 |
| 727,891 | Great Britain | Apr. 13, 1955 |